(12) United States Patent
Erfani et al.

(10) Patent No.: US 6,708,893 B2
(45) Date of Patent: Mar. 23, 2004

(54) MULTIPLE-USE SMART CARD WITH SECURITY FEATURES AND METHOD

(75) Inventors: Shervin Erfani, Red Bank, NJ (US); Jian Ren, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 125 days.

(21) Appl. No.: 10/122,605

(22) Filed: Apr. 12, 2002

(65) Prior Publication Data

US 2003/0196106 A1 Oct. 16, 2003

(51) Int. Cl.[7] .............................................. G06K 19/06
(52) U.S. Cl. .......................................... 235/492; 380/28
(58) Field of Search ............................. 235/492; 380/28

(56) References Cited

U.S. PATENT DOCUMENTS

| | | | |
|---|---|---|---|
| 4,405,829 A | | 9/1983 | Rivest et al. ............. 178/22.1 |
| 6,618,483 B1 | * | 9/2003 | Vanstone et al. ............. 380/30 |
| 2002/0062330 A1 | * | 5/2002 | Paar et al. ................. 708/492 |
| 2003/0115464 A1 | * | 6/2003 | Nyang et al. ............... 713/171 |

OTHER PUBLICATIONS

Data Encryption Standard (DES) FIPS Pub 46–3, National Institute of Standards and Technology, reaffirmed Oct. 15, 1999, op. 1–22.

* cited by examiner

*Primary Examiner*—Mark Tremblay
(74) *Attorney, Agent, or Firm*—Gregory J. Murgia

(57) ABSTRACT

A smart card is adapted to partially include and employ a triply-secure algorithm for data exchange. The algorithm verifies a user's identity and his simultaneous membership in any groups that he has joined. For this purpose, the algorithm requires only a single insertion of the smart card and only a single input of the user's personal identification number. The algorithm can be used in smart cards or in computer networks for identity verification and membership proof. A combination of three different hard problems is used. The first one is based on integer factorization, such as the RSA authenticating technique, and the second one is based on a discrete logarithm, and the third one is based on the coefficients of a polynomial function. In a typical application using smart cards, a certification authority (CA) establishes requirements for preparation and issuance of a multi-purpose card.

13 Claims, 8 Drawing Sheets

ALGORITHM APPLICATION MODEL

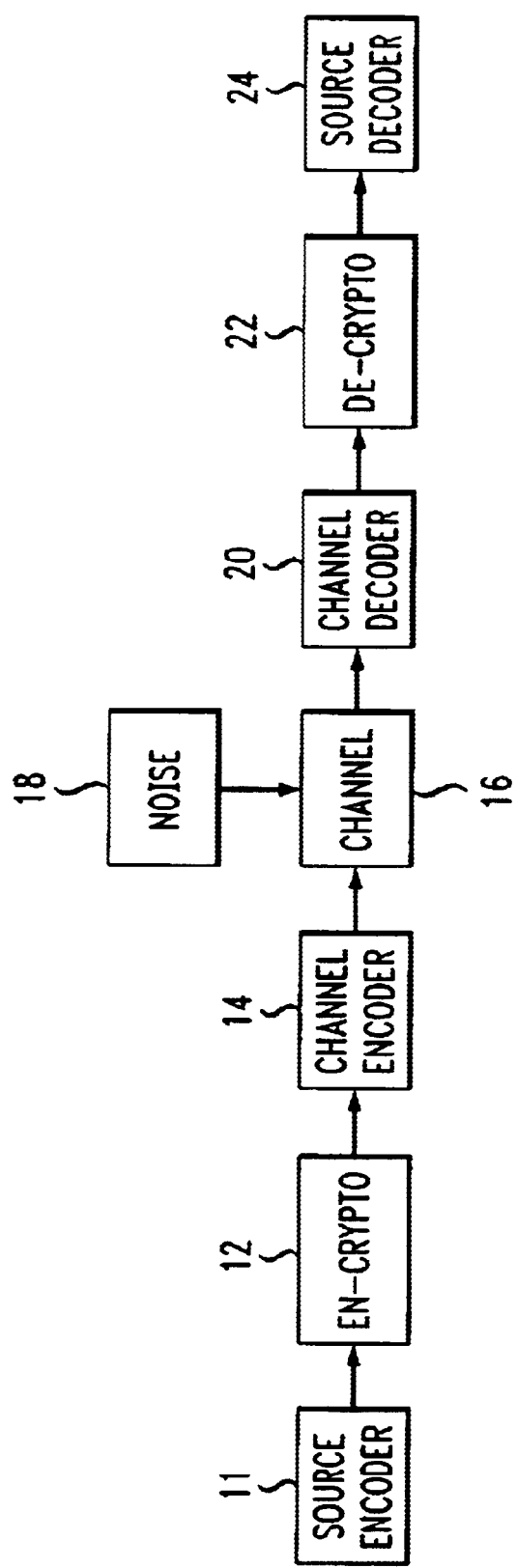

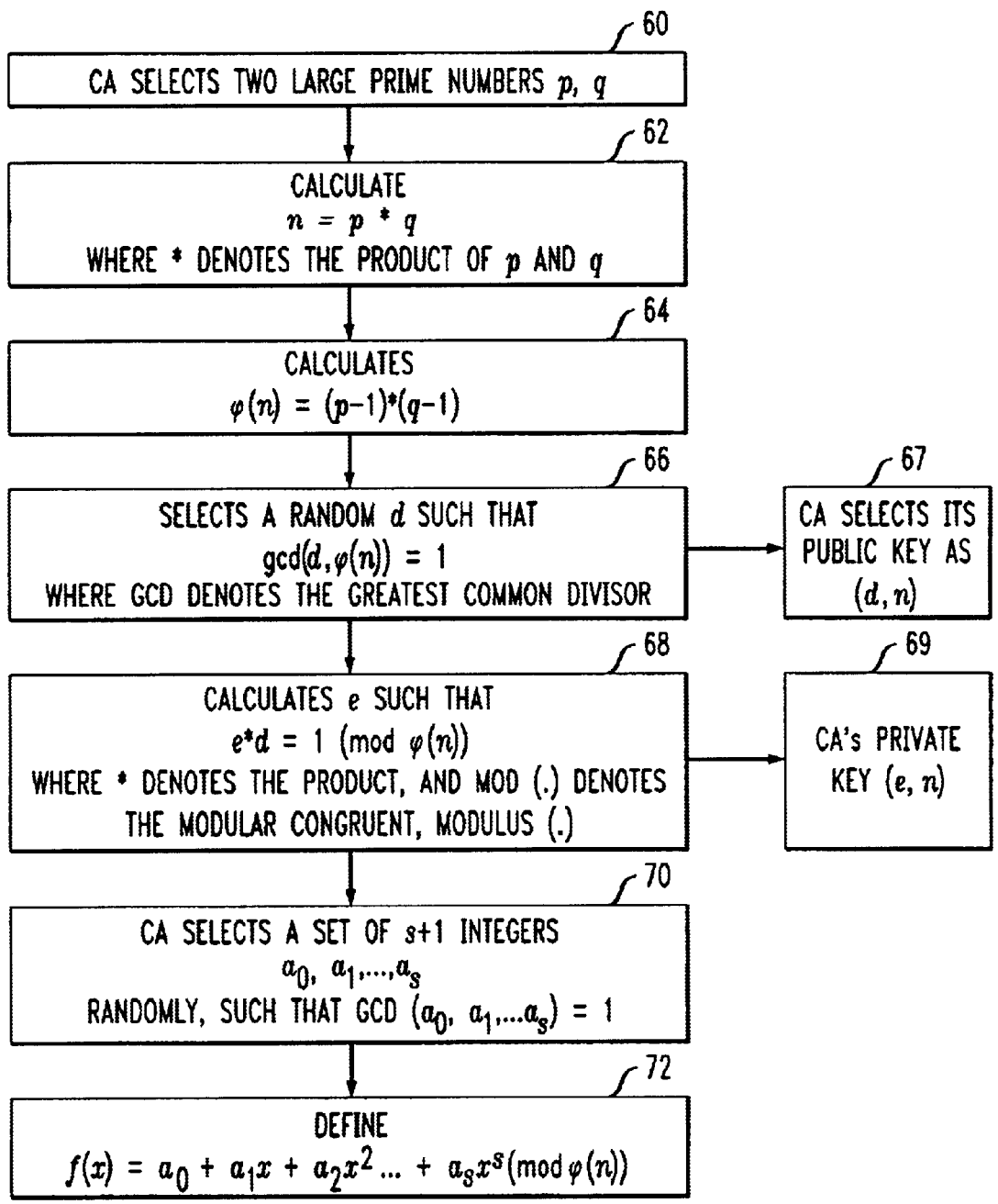

USER U REGISTERS TO CA PROCESS

GROUP G REGISTERS TO CA PROCESS

PROCESS FOR USER U TO PROVIDE HIS/HER MEMBERSHIP OF A GROUP TO A VERIFIER

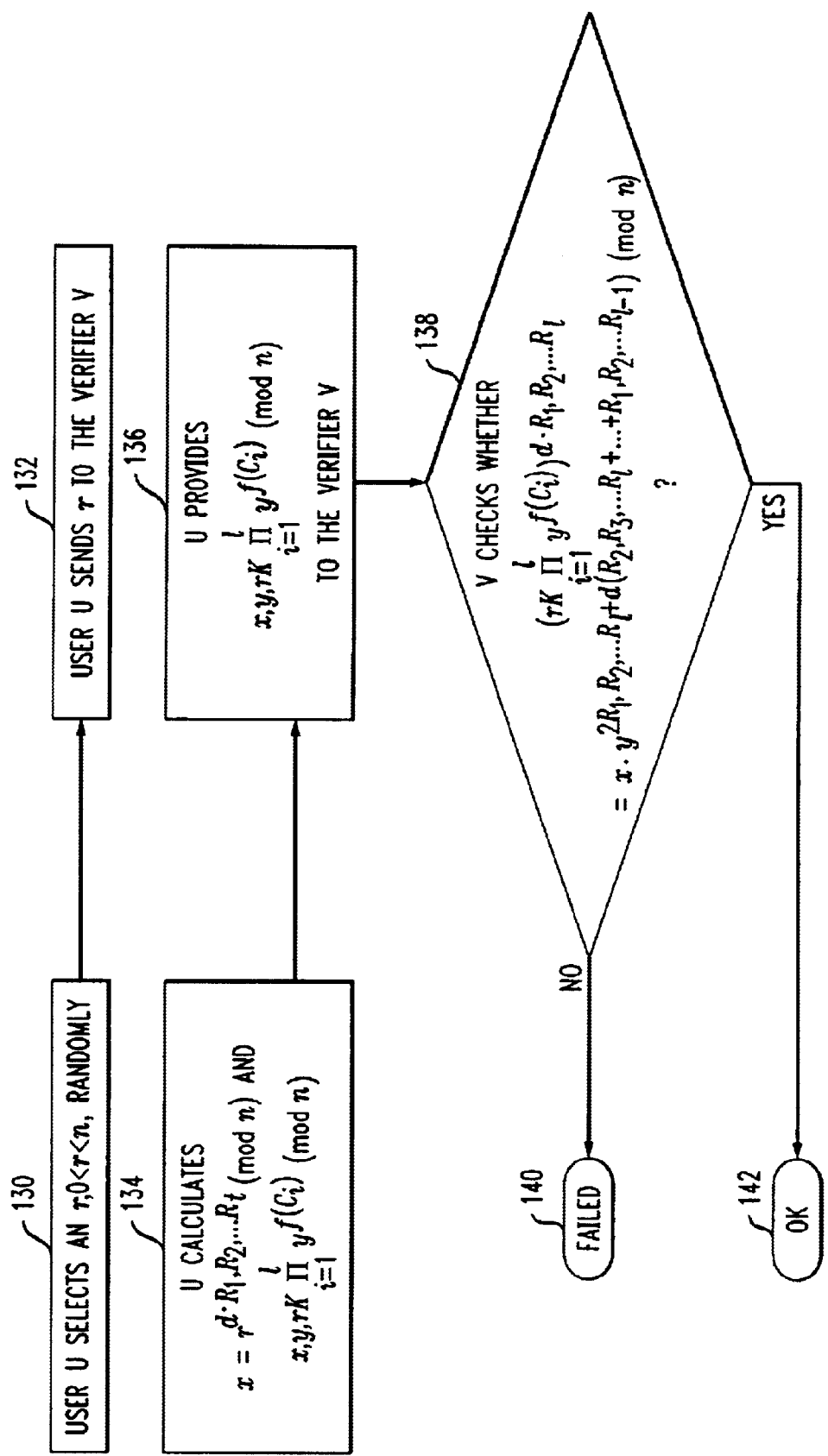

MULTIPLE-USE SMART CARD WITH SECURITY FEATURES AND METHOD

TECHNICAL FIELD

The invention relates generally to cryptographic communications systems, to security management devices and methods, and methods for identity verification. More particularly, the invention relates to client/server applications, such as smart card applications, wherein there exists a need to provide an authentication mechanism to simultaneously provide identity verification and membership proof for multiple groups.

BACKGROUND OF THE INVENTION

With the rapid growth of electronic mail systems and electronic commerce, including electronic funds transfer systems and the like, users and service providers are demanding increased security for data transferred over unsecured communication channels such as the Internet and increased security of sensitive data during access and storage. Consequently, cryptographic schemes of various sorts are now often used to ensure the privacy and authenticity of messages when accessing and communicating via the Internet or any other unprotected data access channel or unsecured communication channel.

In conventional cryptographic systems, a method of encryption is utilized to transform a "plain text" message into "cipher" or a "ciphertext" message, which presumably is in an unintelligible form. Thereafter, a method of decryption is utilized for decoding the encrypted message to restore the message to its original intelligible form.

In many popular cryptographic systems, binary coded data is cryptographically protected using an encryption algorithm in conjunction with a "key", e.g., a binary number or series of numbers, for enciphering and deciphering the message or underlying data. This key makes the results of encrypting data using the encryption algorithm unique. Selection of a different key causes the encryption that is produced for a given set of inputs to be different. Unauthorized recipients of the ciphertext, who may know the encryption algorithm but who do not have the key, cannot derive the original data or message.

In such systems, unrecorded plain text information is encrypted into ciphertext and decrypted back into its original form utilizing an algorithm that sequences through enciphering and deciphering operations which depend on the binary key code. For example, the National Bureau of Standards approved a block cipher algorithm in 1977, referred to as the *Data Encryption Standard* (DES), e.g., Data Encryption Standard FIPS Pub 46, National Bureau of Standards, Jan. 15, 1977.

Often, cryptographic signature and authentication systems utilize a "one-way" hashing function to transform the plain text message into a condensed form that is also unintelligible. A "hashing" function, as generally referred to herein, is a mathematical operation or series of operations that are performed on an aggregation of digital data to create a smaller, more easily processed aggregation of data.

In the cryptographic environment, an important characteristic of the hashing function is its "one-way" function. Ideally, this means that the hashing function should be computationally easy to compute given a set of underlying data, but that it should be computationally impossible to determine that some underlying data give the calculated hash value. For practical reasons, the value obtained from applying a hashing function to the original message or aggregation of data should also be unique, i.e., a virtual certified message of the original message or data. Consequently, if the original message data is different in any manner, the "hash" of such modified data will also be different.

In a "public key" cryptographic system, the encryption and decryption processes are decoupled in such a manner that the encrypting process key is separate and distinct from the decrypting key. Thus, for each encryption key there is a corresponding decryption key that is not the same as the encryption key. Moreover, given the knowledge of one key, it is usually not feasible to compute the other corresponding key.

In this type of public key system, the encryption keys for all users may be distributed or published and anyone desiring to communicate over an unsecured communication channel simply encrypts a message using the recipient's public key. Only the recipient who retains the corresponding secret decrypting key is able to decipher the received (or intercepted) message. Revealing the encryption key discloses nothing useful about the decrypting key, i.e., only persons having knowledge of the decrypting key can decrypt the message. An example methodology for the practical implementation of such a public key cryptographic system, known as the RSA cryptographic system, is disclosed in U.S. Pat. No. 4,405,829, issued to Rivest et al.

A major concern in public key and other cryptographic systems is the need to confirm that the person seeking access to a message is actually the person who is the "owner" of, i.e., is authorized to have access to, this message. This concern gives rise to the need for "identity verification", which can be used to authenticate the person seeking access to the message. In this regard, an identity verification scheme is analogous to an ordinary photo ID but used to verify the identity of a person electronically. Consequently, the identity must be unique and recognizable to everyone. Moreover, in order to be practical, the identity should be easy to validate, impossible to forge, and acceptable as admissible evidence in any court of law.

The general rule is that a public key cryptosystem is based on a hashing function. There are basically two kinds of hashing functions that have been proven secure and have been widely used throughout the past decades or so of scientific scrutiny. One is the factoring of a large integer and the other is a discrete logarithm.

Nevertheless, neither technique has provided sufficient security, including identity verification, to enable different service providers to allow convenient combinations of their services.

SUMMARY OF THE INVENTION

According to the principles of the invention, a multi-purpose end-user authentication scheme and mechanism provides cryptographically strong security, including services of strong authentication of a user's membership in a group upon request for use and strong verification of the user's identity. The principles of the invention rely on the use of a combination of three hard problems, in the mathematical sense. That combination makes multi-purpose end-user information secure and extremely easy to manage. More specifically, authentication and verification are based on a plurality of types of cryptographic security including a combination of integer factorization, such as the RSA authenticating technique, a discrete logarithm, and coefficients of a polynomial function.

In one illustrative embodiment, a smart card is adapted to partially include and employ a triply-secure algorithm for data exchange. The algorithm verifies a users identity and his simultaneous membership in any groups that he has joined. For this purpose, the algorithm requires only a single insertion of the smart card and only a single input of the user's personal identification number. The algorithm can be used in smart cards or in computer networks for identity verification and membership proof.

According to the principles of the invention, the multi-purpose, end-user authentication scheme and mechanism not only brings convenience to the bearers, but also brings the bearers the best security protections for their sensitive information. All these features combine to offer a multi-purpose, end-user authentication scheme and mechanism with very significant advantages over prior techniques and a resultant opportunity for commercial acceptance. For example, a user can carry just one multi-purpose smart card and use just one personal identification number (PIN) card instead of carrying multiple credit, debit, and other membership cards, each requiring separate entry of a PIN. Moreover, the multiple-purpose functions do not have to be from the same service provider.

BRIEF DESCRIPTION OF THE DRAWING

A more complete understanding of the present invention may be obtained from consideration of the following detailed description of the invention in conjunction with the drawing, with like elements referenced with like reference numerals, in which:

FIG. 1 is a block diagrammatic that shows an exemplary digital communication system at a client/server site, which system may be used in conjunction with embodiments of the present invention;

FIG. 3 is a flow diagram of a method implemented by a certification authority according to the principles of the invention;

FIG. 8 is a flow diagram of verification of a clients membership in multiple groups according to the principles of the invention.

DETAILED DESCRIPTION

Figure 2A:
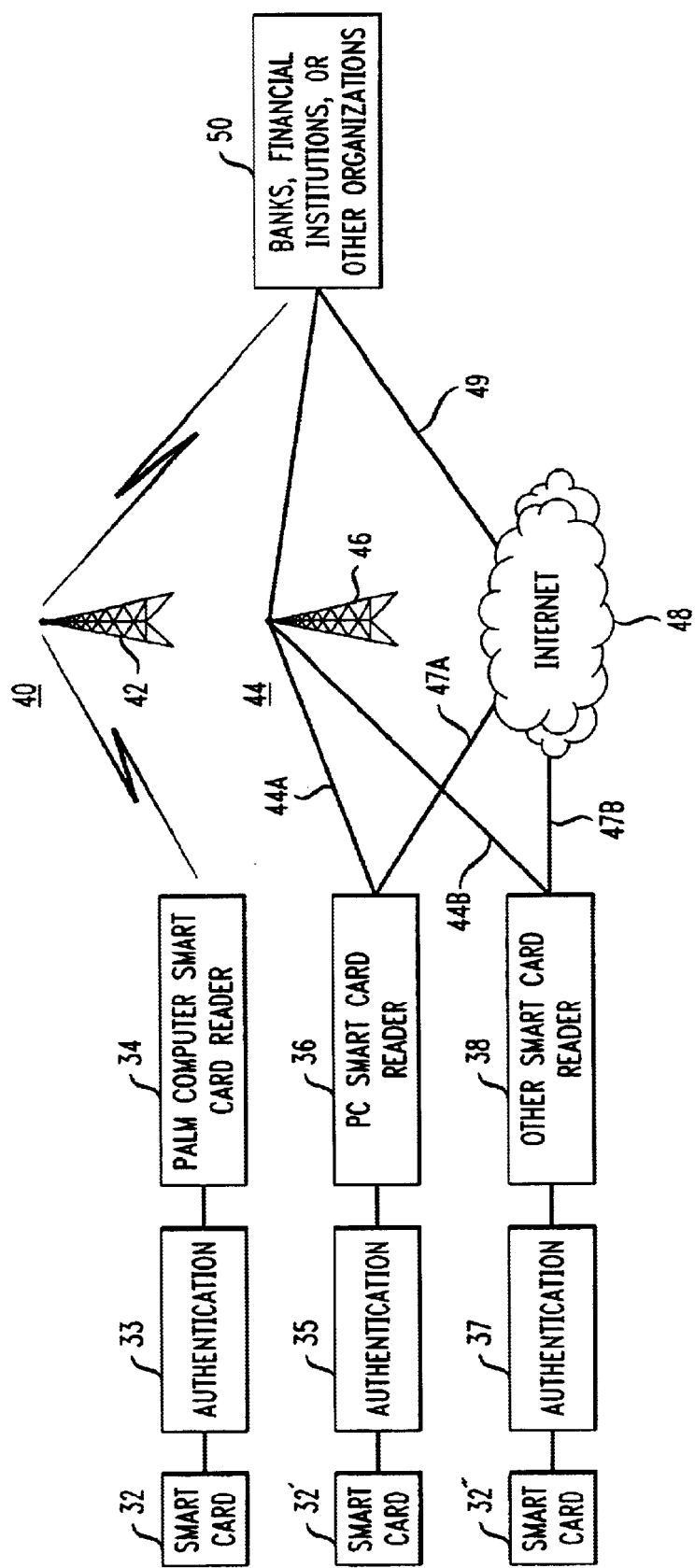
FIG. 2A is a partially pictorial and partially block diagrammatic that shows a more specific implementation to the invention.

In the following description, for purposes of explanation and not limitation, specific details are set forth, such as particular components, interface, techniques, etc., in order to provide a thorough description of the present invention. However, it will be apparent to one skilled in the art that the present invention may be practical in other embodiments that depart from these specific details. In other instances, detailed descriptions of well-known methods, algorithms and programming procedures are omitted so as not to obscure the description of the present invention with unnecessary detail.

In order to interest diverse card-issuing agencies, such as credit card agencies, debit card agencies, medical insurance agencies, recreational and prestige clubs, and other private or public agencies in the use of a single smart card by a client, it will be necessary to provide an unprecedented level of security, not only as to the identity of the client, but also his status, particularly his membership in each participating agency. Even with the growing use of smart cards, the existing systems require a user of such services to carry a large number of cards, each of which provides only limited protection to the user and to the issuing agency. A single-card system with improved security is central to the preferred implementation of the invention described herein.

In one exemplary embodiment, CA represents a certification authority and ID represents the identification number of an individual user. Each user needs to register with the CA, and once registered, may also register as a member with as many participating agencies or groups as he desires or can qualify for. According to one illustrative embodiment, preparation and registration could include the exemplary processes and steps set forth below. It should be noted that the processes and steps set forth below will be subsequently described in further detail with reference to specific figures, e.g., flow diagrams. As such, the corresponding figure is included for cross-reference purposes.

CA Preparation Process (FIG. 3)
Step 1. Select two prime numbers p, q.
Step 2. Let n=pq.
Step 3. Calculate $\phi(n)=(p-1)(q-1)$.
Step 4. Let Certification Authority (CA)'s public key be (d, n).
Step 5. Let, for an RSA algorithm, a corresponding private key be (e, n).
Step 6. CA selects s+1 integers $a_0, a_1, \ldots, a_s$ randomly, such that $\gcd(a_0, a_1, \ldots, a_1)=1$, where gcd stands for "greatest common denominator".
Step 7. Define $f(x)=a_0+a_1x+a_2x^2 \ldots +a_sx^s(\mod \phi(n))$. In general, a mod $\phi(n)$ is defined as r, for which $a=d\cdot\phi(n)+r$, where $0\leq r<\phi(n)$. The $a_i$'s are random numbers that the CA needs to select, and x is a variable used to show to the nature of f(x). The function f(x) and its calculation for a specific variable are a third module of the algorithm of the present invention. Modules 1 and 2 will be defined hereinafter in the context of their use.

Group G Registers with the CA (FIG. 5)
Step 1. CA selects a private key C for group G such that $\gcd(f(C), \phi(n))=1$, where gcd stands for greatest common denominator and f(C) is a particular application of the third module of the algorithm.
Step 2. CA calculates the public key R for group G such that $f(C) R=1(\mod \phi(n))$.
Step 3. CA keeps f(C) to itself as group G's registration record.

User U Registers with the CA (FIG. 4)
Step 1. User U selects a number y that contains U's some predefined personal information, e.g., SSN, etc.
Step 2. Calculate $g=y^e(\mod n)$, making g readable to only User U. These first two steps are the first module of the algorithm of the invention.
Step 3. Store (g, y) and $T=(y^{a_0}, y^{a_1}, \ldots, y^{a_s}) (\mod n)$ in U's smart card, where notations are meant to be consistent with related ones given above. From the preceding, recall that $a_i$'s are the same random numbers that the CA has selected for calculating f(x). The function T and its calculation are the second module of the algorithm of the invention.

Step 4. CA calculates and stores $K=y^{2e}$(mod n) in U's smart card.

U registers with a Group G (FIG. 6)
Step 1. User U provides y and K to group G.
Step 2. G checks whether $y^2=K^d$(mod n). If no, stop. Otherwise, go to Step 3.
Step 3. G calculates $$G(U) = \prod_{j=0}^{s} (y^{a_j})^{C^j} = y^{a_0+a_1C+\ldots+a_sC^s} = y^{f(C)} \pmod{n}$$

where C is group G's private key selected by the CA, notations being consistent. G(U) and its calculation comprise the fourth module of the algorithm of the invention.
Step 4. Store G(U) in User U's smart card.

According to one illustrative embodiment, verification could include the following:
Verification that a User U is a Member of G (FIG. 7)
Step 1. User U selects an r, 0<r<n, randomly.
Step 2. U calculates $x=r^{d \cdot R}$(mod n), and provides x and y to a verifier V.
Step 3. User U provides $rKy^{f(C)}$(mod n) to V;
Step 4. V checks whether $(rKy^{f(C)})^{d \cdot R}=x \cdot y^{2R+d}$(mod n). If yes, then U is a legitimate user, otherwise, U is an illegitimate user.

It should be noted that this verification process can be repeated until the verifier is sure the user U is a legitimate user. To prevent "play-back" attack, r may be required to contain the time of the current verification with a limited pre-assigned time difference.

Verification that a User U is a Member of Groups $G_1$, $G_2, \ldots, G_l$ (FIG. 8)
Step 1. User U selects an r, 0<r<n, randomly.
Step 2. U calculates $x=r^{d \cdot R_1 \cdot R_2 \cdots R_l}$(mod n), where notations are meant to be consistent with related ones given above.
Step 3. User U provides to the Verifier x, y, and $$rK\prod_{i=1}^{l} y^{f(C_i)} \pmod{n}.$$

Step 4. V checks whether:

$$\left(rK\prod_{i=1}^{l} y^{f(C_i)}\right)^{d \cdot R_1 \cdot R_2 \cdots R_l} =$$

$$x \cdot y^{2 \cdot R_1 \cdot R_2 \cdots R_l + d(R_2 \cdot R_3 \cdots R_l + \ldots + R_1 \cdot R_2 \cdots R_{l-1})} \pmod{n}$$

If yes, then U is a legitimate user, otherwise, U is an illegitimate user.

It should be noted that this verification can be repeated and U is a legitimate user if and only if V succeeds in each verification. To prevent "play-back" attack, r may be required to contain the time of the current verification with a limited pre-assigned time difference.

While the smart card, according to the principles of the invention, must store items of information and elements of the algorithm as specified above, preferably it stores the entire algorithm and thereby serves as a back-up for downstream elements of a communication system using the invention.

In FIG. 1, the illustrative algorithm application model is shown in a block diagram of a digital communication system in which the user presents his multi-purposes card to a smart card reader included in a source encoder 11. The user indicates to source encoder 11 which group G, represented at source decoder 24, he wishes to use. Source encoder 11 sends appropriate data to en-crypto stage 12, which includes the above-described cryptographic mechanisms, including digital signature. En-crypto stage 12 then sends the encrypted data to channel encoder 14, which in turn sends it over channel 16. It is noted that channel 16 is typically subject to noise from at least one noise source 18. The digital nature of the encoded data should enable a superior level of resistance to such noise. All the usual techniques may be employed. Channel 16 connects to channel decoder 20 of the requested group, for example, group $G_1$. Decoder 20 connects to de-crypto stage 22, which includes not only decryption, but also the verification techniques described above.

Source decoder 24 decodes the result to give an intelligible signal to group $G_1$ and also to encode the automatic acceptance or rejection response in the reverse direction back to source encoder 11 and user U. Thus, the above-described algorithm of the invention is used as needed, mainly in en-crypto stage 12 and in de-crypto stage 22.

In FIG. 2A, three different exemplary ways are shown for presenting a smart card to the system for presentation to various banks, financial institutions, or other organizations. In each of three instances, essentially the same smart card 32, assuming the same user U, is inserted into the appropriate smart card reader. In the first example, smart card 32, prepared as described above, is inserted into authenticator 33 associated with palm computer smart card reader 34. Authenticator 33 may be a separate device connected to smart card reader 34, as shown, or may be within palm computer smart card reader 34 bearing the insertion slot. Authenticator 33 provides the function of verifying the identity of the user U as described above, while smart card reader 34 provides other functions normally associated with handling smart cards. From smart card reader 34, information is transmitted over radio link 40 via microwave relay tower 42 to the selected institution. The conversion from a computer signal to a microwave signal can occur in reader 34, or separately, for example, as a part of microwave link 40.

In the second example, card 32, or card 32' if the information therein has been changed by user U, is inserted into authenticator 35 associated with personal computer 36 for verifying user identity. Again, authenticator 35 may be part of personal computer 36. The appropriate information is transmitted via communication link 44, e.g., microwave link 44A in this instance, which may include radio relay tower 46, for transmission to the selected institution. Alternatively, the information can be transmitted over Internet 48 via paths 47A and 49 to the same destination.

In the third example, card 32" is inserted into authenticator 37 associated with some other smart card reader 38 for transmission of information, again by communication link 44, or more specifically 44B and microwave relay tower 46 or by path 47B, Internet 48 and path 49.

The variety of smart card readers and communication links are virtually limitless, but all may be adapted for use with the multi-purpose smart card according to the principles of the invention.

Figure 2B:
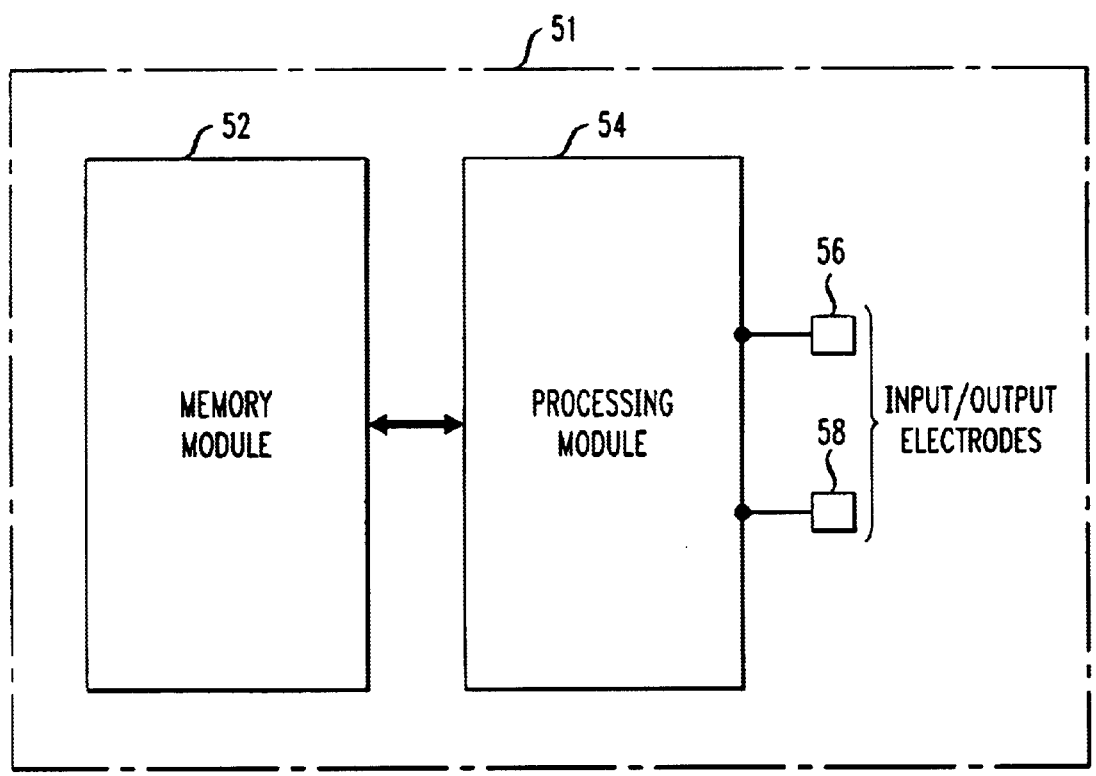
FIG. 2B is a partially pictorial and partially block diagrammatic that shows a smart card adapted for use with an algorithm according to the principles of the invention.

For use with the illustrative configurations of FIG. 2A, an exemplary smart card structure is shown in FIG. 2B. More specifically, smart card 51, which looks and feels like an ordinary credit card, includes memory module 52, which provides the information storing functions described in the algorithm above. In one exemplary embodiment, memory module 52 is an electrically-erasable field-programmable read-only memory although other memory elements are also contemplated by the teachings herein. Memory module 52 communicates bi-directionally with processing module 54, which provides any calculations necessary to provide parameters required by the encrypting and decrypting functions shown in FIG. 1, as set out in the algorithm above. Processing module 54 also determines the location of items within memory module 52 and provides communication functions with the various card readers and/or authenticators. Electrical coupling with card readers and authenticators is provided, in the illustrative embodiment, through electrodes 56 and 58, which may be configured to provide either direct electrical contact coupling or capacitive coupling. Illustratively, smart card 51 stores the first, second, and third modules of the algorithm, but also stores all of the other elements of the algorithm to serve as a back-up for authenticators 33, 35, and 37 of FIG. 2A and to serve as a back-up for en-crypto unit 12 and de-crypto unit 22 of FIG. 1. Other optional details of such smart cards are known in the art, as for example disclosed in U.S. Pat. No. 4,795,898 to Bernstein et al.

The flow diagram shown in FIG. 3 shows the steps that correspond to the equations, as set forth above, for the preparation process by the certification authority (CA). In step 60, CA selects two large prime numbers and in steps 62–68 proceeds to calculate and select quantities appropriate to an RSA system and in steps 70–72 makes a selection of f(x) based on the 'hard' problem as described in step 7 of the "CA Preparation Process" above. These quantities reappear in the hashing functions used to identify user U to the various groups in which he registers and to verify his membership. Please refer to the preceding description of the formulas and equations for further information. Note the use of public and private keys in steps 67 and 69.

Figure 4:
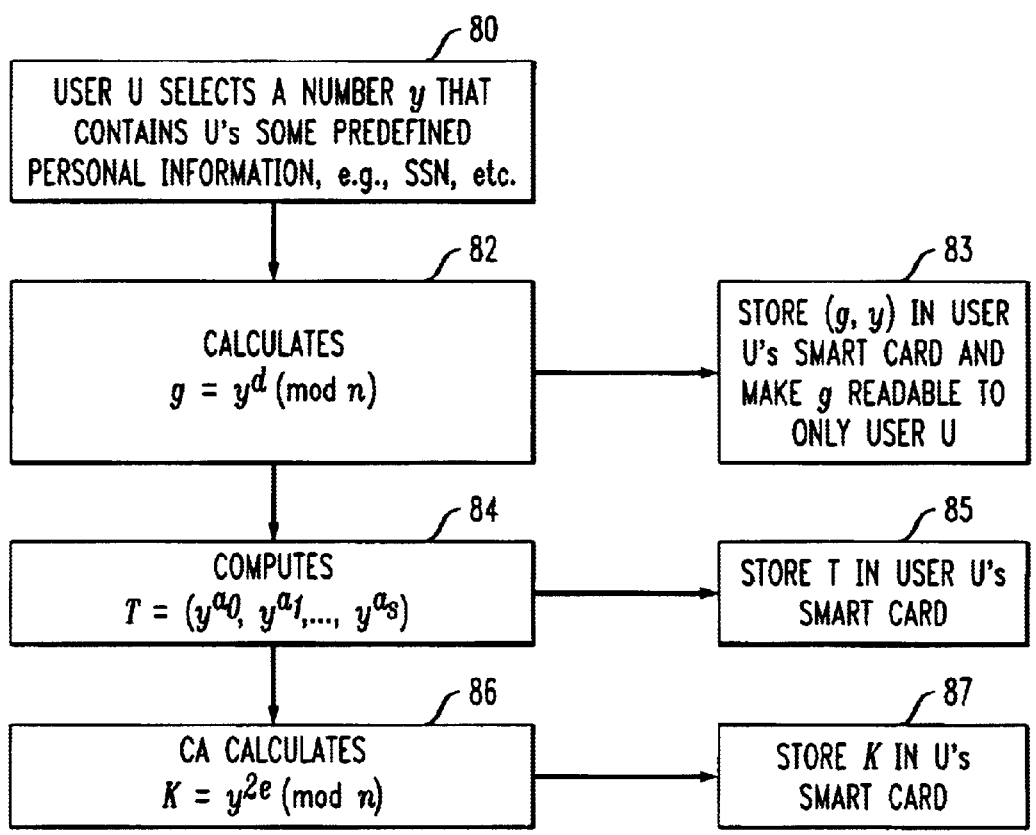
FIG. 4 is a flow diagram of registration of a client, such as a smart card user, with a certification authority according to the principles of the invention.

In the flow diagram of FIG. 4, user U registers with the CA and its process provides the basis for securely encrypted, verifiable identity via steps 80–86. Herein, step 84 is based on a discrete logarithm. Other details are as given above in the initial presentation of the algorithm. Note that this procedure uses some of the same parameters, such as mod(n), $e_1$ and the $a_i$'s ($a_0$, $a_1$, ...) developed for the RSA system.

Figure 5:
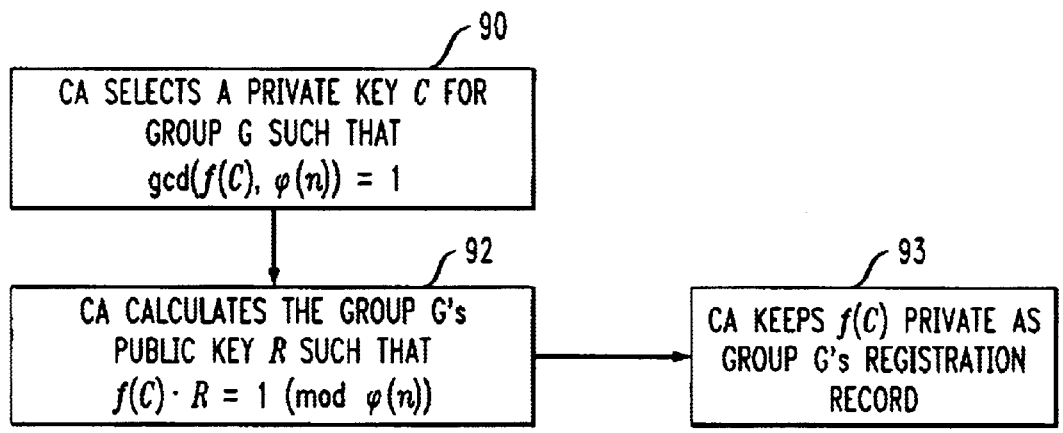
FIG. 5 is a flow diagram of registration of an exemplary group, such as a credit card agency, with the certification authority according to the principles of the invention.

In the flow diagram of FIG. 5, Group G registers with the CA (Certification Authority) and invokes its process. In step 90, the CA selects a private key C for Group G satisfying that f(C) and $\phi(n)$ are relatively prime. In step 92, the CA calculates G's public key R such that f(C)·R=1 (mod $\phi(n)$). In step 93, the CA safeguards the private key, which in effect can be G's registration record.

Figure 6:
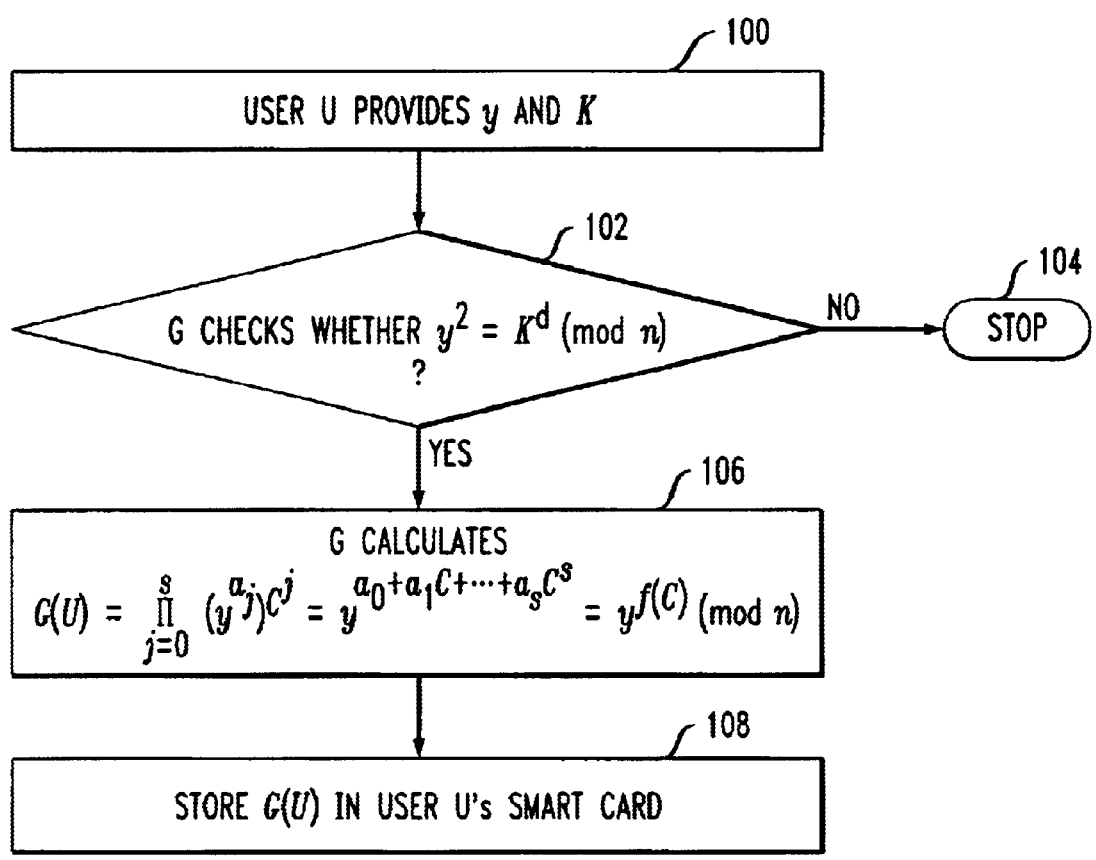
FIG. 6 is a flow diagram of the registration of a client with an exemplary group according to the principles of the invention.

In the flow diagram of FIG. 6, User U registers with Group G and invokes its process. In step 100, U provides the parameters y and K developed for him in his registration with the CA. In step 102, Group G checks these parameters for consistency. Rejection occurs in step 104 if the test fails. Otherwise, U's identity has been verified and G calculates indicia of membership for U in step 106 using the discrete logarithm and then stores the indicia of membership in his smart card in step 108.

Figure 7:
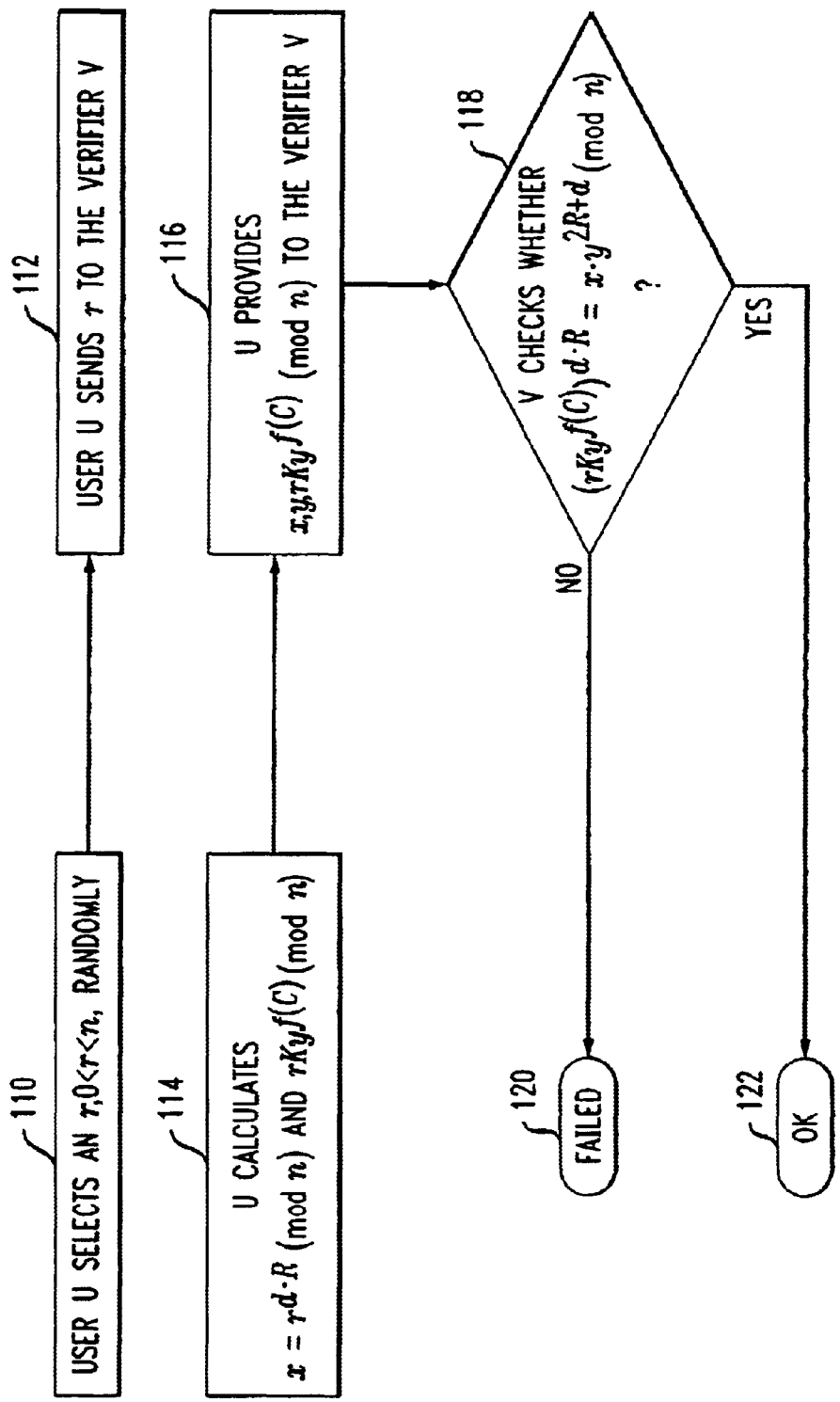
FIG. 7 is a flow diagram of verification of a client's membership in an exemplary group at the server site according to the principles of the invention.

The following events set out in the verification process of the flow diagram of FIG. 7 occur before Group G decrypts any transaction information from user U. Hereby, U unequivocally establishes whether he is a member of Group G. Based on the above algorithm, U himself performs steps 110, 112, 114 and 116. In step 118, Verifier V performs a consistency check. Acceptance or rejection occurs at steps 122 or 120.

The verification process of FIG. 8 differs from that of FIG. 7, in that the steps 130 to 142, while similar to the membership proof of FIG. 7, assist U's gaining approval simultaneously for transactions with several different groups, $G_1$, $G_2$, etc. The calculation of step 134 and the submission to Verifier V in step 136 are adapted to this end. The fail or pass checks of step 138 are performed in a sequential manner as indicated by the mathematics.

It should be apparent that various changes can be made in the above examples without departing from the spirit of the invention, as claimed hereinafter. For example, it is not necessary to limit the extent of the proposed algorithm as long as the hardware and process capacities of the implementation allow the extension of the algorithm.

We claim:

1. A smart card comprising:

a processor for processing data;

input/output apparatus operably connected to the processor for communicating with a reader/writer station for any of a plurality of data user groups; and memory for storing information, the memory being operably connected with the processor to transfer stored information permitting an algorithm to verify the identity of a proper user and refuse use by other users, the memory simultaneously providing information for verifying the user's membership in or lack of membership in any of the plurality of data user groups and correspondingly allowing or refusing access to the data of a particular one of the plurality of data user groups according to the algorithm, the algorithm being at least partially included in the memory and providing in each instance a plurality of types of cryptographic security for the data.

2. The smart card according to claim 1, wherein the included portion of the algorithm requires only one personal identification number for use for all of the plurality of data user groups.

3. The smart card according to claim 2, wherein the processor is adapted to communicate with any of a plurality of external entities containing other portions of the algorithm, the algorithm together including a first module that is a function of a number y that contains some of the smart card user's personal information, the first module being the included portion stored in the memory on the smart card, a second module that includes a function of y and some parameters established by a certification authority and that is stored separately in the smart card, and a third module that includes a polynomial function f(x) established by the certification authority and that is stored separately in the smart card.

4. The smart card according to claim 3, wherein the algorithm includes a fourth module that is a record of the user's membership in a group, said fourth module including a function that includes parameters from each of the first, second, and third modules.

5. The smart card according to claim 4, wherein the algorithm triggers validation procedures including consistency checks for identity and membership in an appropriate reader and upon request by the user for use in any of a plurality of groups.

6. A multi-purpose end-user authentication method that can provide cryptographically strong security, including services of strong authentication of a user's membership in a group upon request for use and strong verification of the user's identity, in which security of the authentication and the verification is based on a plurality of types of cryptographic security, the method comprising:

invoking an integer factorization system in at least one of the services of authentication of the user's membership in the group and verification of the user's identity;

employing cryptographically a discrete logarithm in at least one of the services of authentication of the user's membership in the group and verification of the user's identity; and using cryptographically coefficients of a polynomial f(x) in cooperation with at least one of the steps of invoking the integer factorization system and of employing cryptographically the discrete logarithm.

7. The multi-purpose end-user authentication method according to claim 6, wherein a user requests use by presenting a card having data encrypted therein relating to his identity and to his membership in multiple data user groups.

8. The multi-purpose end-user authentication method according to claim 7, wherein the strong identity verification uses a hard problem that requires zero knowledge proof.

9. The multi-purpose end-user authentication method according to claim 7, wherein the strong user membership authentication via one of the invoking and employing steps authenticates membership in a plurality of groups to which the card can provide access in response to a single input of a user's personal identification number.

10. The multi-purpose end-user authentication method according to claim 6, wherein the steps respond to an interfacing smart card including a first module that is a function of a number y that contains some of the smart card user's personal information and a second module that includes a function of y and of some of the parameters of the integer factorization system that is established by a certification authority, and a third module that includes another function of the integer factorization system established by the certification authority, the method initiating, upon request, validation procedures including consistency checks with respect to identity of the user.

11. The multi-purpose end-user authentication method according to claim 10, wherein the algorithm includes a fourth module that is a record of the user's membership in a group, said fourth module including a function that includes parameters from each of the first, second, and third modules, the algorithm initiating, upon request, validation procedures including consistency checks both with respect to identity and with respect to membership in one or more groups without a further insertion of a card.

12. The multi-purpose end-user authentication method according to claim 8, wherein the algorithm is adapted with a plurality of hard problems to permit the card to provide access in response to a single input of the user's personal identification number.

13. The multi-purpose end-user authentication method according to claim 6, wherein the step of invoking an integer factorization system comprises employing an RSA system.

* * * * *